United States Patent
Fareed

(10) Patent No.: US 7,685,575 B1
(45) Date of Patent: Mar. 23, 2010

(54) METHOD AND APPARATUS FOR ANALYZING AN APPLICATION

(75) Inventor: Hussein M. Fareed, Lake Mary, FL (US)

(73) Assignee: Sun Microsystems, Inc., Santa Clara, CA (US)

( * ) Notice: Subject to any disclaimer, the term of this patent is extended or adjusted under 35 U.S.C. 154(b) by 1688 days.

(21) Appl. No.: 10/863,667

(22) Filed: Jun. 8, 2004

(51) Int. Cl.
*G06F 9/44* (2006.01)
*G06F 11/00* (2006.01)

(52) U.S. Cl. .................. 717/131; 717/125; 717/130; 714/37; 714/38

(58) Field of Classification Search .............. None
See application file for complete search history.

(56) References Cited

U.S. PATENT DOCUMENTS

| | | | | |
|---|---|---|---|---|
| 5,355,321 A * | 10/1994 | Grodstein et al. | ........ | 716/6 |
| 5,774,729 A * | 6/1998 | Carney et al. | ........ | 717/126 |
| 5,799,188 A * | 8/1998 | Manikundalam et al. | .... | 718/108 |
| 6,282,701 B1 * | 8/2001 | Wygodny et al. | ........ | 717/125 |
| 6,389,112 B1 * | 5/2002 | Stewart et al. | ........ | 379/29.09 |
| 6,427,161 B1 * | 7/2002 | LiVecchi | ........ | 718/102 |
| 6,430,707 B1 * | 8/2002 | Matthews et al. | ........ | 714/37 |
| 6,633,876 B1 * | 10/2003 | Heatlie | ........ | 707/10 |
| 6,643,802 B1 * | 11/2003 | Frost et al. | ........ | 714/37 |
| 6,792,559 B1 * | 9/2004 | Cohen et al. | ........ | 714/15 |
| 6,941,379 B1 * | 9/2005 | Dingsor et al. | ........ | 709/235 |
| 7,000,150 B1 * | 2/2006 | Zunino et al. | ........ | 714/38 |
| 7,028,056 B1 * | 4/2006 | Hendel et al. | ........ | 707/202 |
| 7,058,928 B2 * | 6/2006 | Wygodny et al. | ........ | 717/128 |
| 7,243,267 B2 * | 7/2007 | Klemm et al. | ........ | 714/38 |
| 7,278,057 B2 * | 10/2007 | Betancourt et al. | ........ | 714/38 |
| 7,293,260 B1 * | 11/2007 | Dmitriev | ........ | 717/130 |
| 7,318,218 B2 * | 1/2008 | Aguilar et al. | ........ | 717/124 |
| 7,502,968 B2 * | 3/2009 | Betancourt et al. | ........ | 714/38 |
| 2002/0066024 A1 * | 5/2002 | Schmall et al. | ........ | 713/200 |
| 2002/0147860 A1 * | 10/2002 | Tapperson | ........ | 709/330 |
| 2003/0074605 A1 * | 4/2003 | Morimoto et al. | ........ | 714/38 |
| 2003/0182598 A1 * | 9/2003 | Ma et al. | ........ | 714/39 |
| 2003/0187995 A1 * | 10/2003 | Fok et al. | ........ | 709/227 |
| 2004/0064552 A1 * | 4/2004 | Chong et al. | ........ | 709/224 |
| 2004/0078667 A1 * | 4/2004 | Salem | ........ | 714/26 |
| 2004/0153847 A1 * | 8/2004 | Apte et al. | ........ | 714/43 |
| 2004/0181635 A1 * | 9/2004 | Huras et al. | ........ | 711/151 |
| 2005/0066322 A1 * | 3/2005 | Fink et al. | ........ | 717/151 |
| 2005/0102578 A1 * | 5/2005 | Bliss et al. | ........ | 714/38 |
| 2005/0120273 A1 * | 6/2005 | Hudson et al. | ........ | 714/38 |

OTHER PUBLICATIONS

Liang et al., Comprehensive Profiling Support in the Java Virtual Machine, published by USENIX Association, 1999, p. 1-13.*
Calvin Austin, An Introduction to Java Stack Traces, published Jul. 1998, retrieved online [http://java.sun.com/developer/technicalArticles/programming/stacktrace], pp. 1-5.*
Samurai version 1.2, released Apr. 4, 2004, retrieved onlin [http://web.archive.org/web/20040627154635/http://yusuke.homeip.net/samurai/?english], pp. 1-12.*

* cited by examiner

*Primary Examiner*—Tuan Q Dam
*Assistant Examiner*—Zheng Wei
(74) *Attorney, Agent, or Firm*—Osha • Liang LLP

(57) ABSTRACT

A method for analyzing an application involving obtaining a thread dump of a plurality of threads executing the application, analyzing the thread dump to obtain a result using an aggregation mechanism, and determining a potential error location in source code of the application using the result.

37 Claims, 4 Drawing Sheets

METHOD AND APPARATUS FOR ANALYZING AN APPLICATION

BACKGROUND

Production applications running in a large-scale data center sometimes encounter performance degradation, which may lead to a complete system halt. Large data centers typically employ monitoring tools to monitor system resources used by the production applications and to raise red flags if the application consumes too many system resources. These monitoring tools detect potentially troublesome situations and perform various tasks, such as sending alerts or executing recovery jobs, to prevent a complete system halt. Conventionally, these tools can be configured to automatically take actions (e.g., restarting applications) to restore application availability and to return resource consumption to normal levels.

With the introduction of various component level architectures (e.g., applications executing within containers, where each container is allocated system resources), the relationship between various production applications in a data center is becoming more difficult to determine. For example, a typical scenario may be one in which applications execute inside multiple containers, and each application uses services available to other applications executing inside a different container or inside a cluster of containers. Further, each container may be executing several threads associated with the application in the container. In some instances, the application may run out of threads (i.e., all the threads are consumed in processes and are not returned to the thread pool), causing the container to lock up (i.e., the container cannot respond to any incoming requests due to the lack of threads).

A conventional mechanism for monitoring applications in component level architectures is profiling. Profiling involves the ability to trace executing functions and identify resources used by these functions. Typically, a profiler is called by the system during the execution of a particular function or process. The profiler subsequently receives notices every time an event of interest occurs within the executing function or process. The profiler then gathers statistical data on various events. By gathering statistical data on executing functions, the profiler can build a comprehensive picture of which functions or processes use the most system resources, which functions or process use the least amount of system resources, etc.

Production issues are often non-deterministic, impacting system performance and availability without warning. Almost invariably, these issues occur under peak system load. In some instances, production issues may occur when it is too late to turn on profiling; other times it is difficult to determine which events of an application to trace using profiling. To complicate matters further, in many cases, symptoms of the problem show up in one application while the root cause of the problem may be hidden in another application.

SUMMARY

In general, in one aspect, the invention relates to a method for analyzing an application comprising obtaining a thread dump of a plurality of threads executing the application, analyzing the thread dump to obtain a result using an aggregation mechanism, and determining a potential error location in source code of the application using the result.

In general, in one aspect, the invention relates to an apparatus comprising an application, a plurality of threads executing the application, and an analyzer agent configured to obtain a thread dump of the plurality of threads when the application locks-up, aggregate data associated with the plurality of threads in the thread dump using a filter to obtain a result, and determine a potential error location in source code of the application using the result.

In general, in one aspect, the invention relates to a plurality of nodes comprising an application, a plurality of threads executing the application, and an analyzer agent configured to obtain a thread dump of the plurality of threads when the application locks-up, aggregate data associated with the plurality of threads in the thread dump using a filter to obtain a result, and determine a potential error location in source code of the application using the result, wherein application byte code corresponding to the application resides on any of the plurality of nodes, wherein each of the plurality of threads executes the application on any of the plurality of nodes, and wherein the analyzer agent executes on any of the plurality of nodes.

In general, in one aspect, the invention relates to a computer system for analyzing an application comprising a processor, a memory, a storage device, and software instructions stored in the memory for enabling the computer system under control of the processor, to obtain a thread dump of a plurality of threads executing the application, analyze a thread dump to obtain a result using an aggregation mechanism, and determine a potential error location in source code of the application using the result, wherein the thread dump comprises the state of the application, wherein the thread dump comprises a plurality of stack levels of each of the plurality of threads executing the application, and wherein software instructions to analyze the thread dump using an aggregation mechanism comprise instructions to set a first filter to aggregate the thread dump at one of the plurality of stack levels, and filter the thread dump using the first filter to obtain a first intermediate result.

Other aspects of the invention will be apparent from the following description and the appended claims.

DETAILED DESCRIPTION

Figure 1:
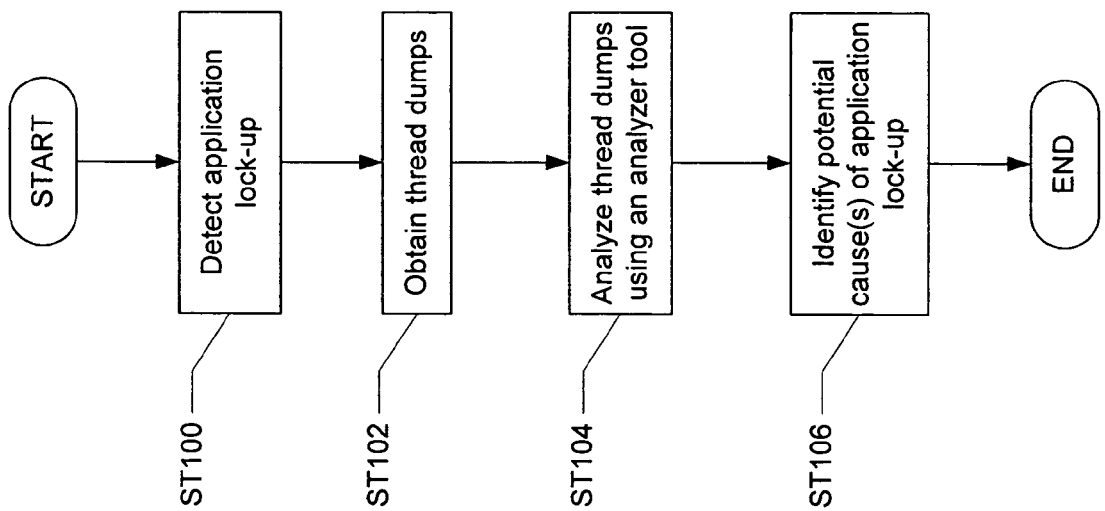
FIGS. 1-2 show flow charts in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to a method and apparatus for analyzing an application. More specifically, one or more embodiments of the invention relate to a method and apparatus for analyzing thread dumps associated with the application. Further, embodiments of the invention provide a method for filtering the data within the thread dump to aid users in locating regions of source code that that may be causing the application to lock-up. In one or more embodiments, the invention provides a method to filter the data in the thread dump using an aggregation mechanism. Further, embodiments of the invention provide a method and apparatus to aggregate data within the thread dump with respect to the contents of a stack level associated with each thread in the thread dump. In one or more embodiments, the aggregation mechanism allows a user to extract valuable information about the state of the application at the time the application locked-up.

The following discussion provides an overview of an embodiment of the method used to analyze an application. FIG. 1 shows a flow chart in accordance with one embodiment of the invention. Initially, a monitoring agent (or equivalent process) tracking the resource usage of the application being analyzed detects that the application has locked-up (i.e., the application is not responding or is not operating at an acceptable level) (ST100). In one embodiment of the invention, the monitoring agent is a process that includes functionality to determine the performance and/or resource usage of the application. In some instances, the monitoring agent tracks application performance (e.g., the number of transactions per second, etc.), while in other cases the monitoring agent may track application resource usage. Regardless of what the monitoring agent specifically tracks, the monitoring agent includes functionality to determine when the application locks-up, or alternatively, when there is a greater likelihood that the application will lock-up. In one embodiment of the invention, the monitoring agent may include a heuristics engine analyzes the information received by the monitoring agent, searches for patterns that indicate that an application is likely to lock-up. If a matching pattern is found, then the heuristics engine may notify the monitoring agent which in turn may take an appropriate action.

Once the lock-up condition (or likelihood of lock-up) is detected, then the monitoring agent (or a related process) obtains and/or collects a thread dump (ST102). Those skilled in the art will appreciate that specific functions or processes used to obtain and/or collect a thread dump may vary among systems and that this should not effect the scope of the application. In one embodiment of the invention, the thread dump includes data corresponding to the status of all threads currently executing the application (i.e., the state of the application). The threads currently executing the application may include threads executing a specific function, threads waiting for the application to respond, etc. Further, depending on the implementation of the particular threads executing the application, the data corresponding to each thread may include the thread name, the name of the thread queue in which the thread was executing, the thread status, and the function or method at each stack level within the thread stack associated with the particular thread (i.e., the stack trace).

The thread dump is subsequently analyzed using an analyzer tool (ST104). In one embodiment of the invention, the analyzer tool includes functionality to filter the data corresponding to each thread within the thread dump based on particular filter criteria, such as thread name, queue name, stack level, thread state, etc. In one embodiment of the invention, when a filter criterion is applied to the thread dump, all threads that meet the necessary criteria are kept while all threads that do not meet the criteria are discarded by the filter. In one embodiment of the invention, the filter subsequently aggregates the remaining threads in the thread dump such that all threads that have the same attributes (e.g., thread name, queue name, status, and function or method at a specified thread stack level) are grouped together (i.e., aggregating the similar threads). The result of filtering the thread dump is then used to identify a possible cause(s) of the application lock-up (ST106). Those skilled in the art will appreciate that the aforementioned filters may be applied in any order. Additional details regarding an embodiment of the analyzer tool's operation and embodiments for identifying the potential cause(s) of the application lock-up are described below in FIG. 2.

Figure 2:
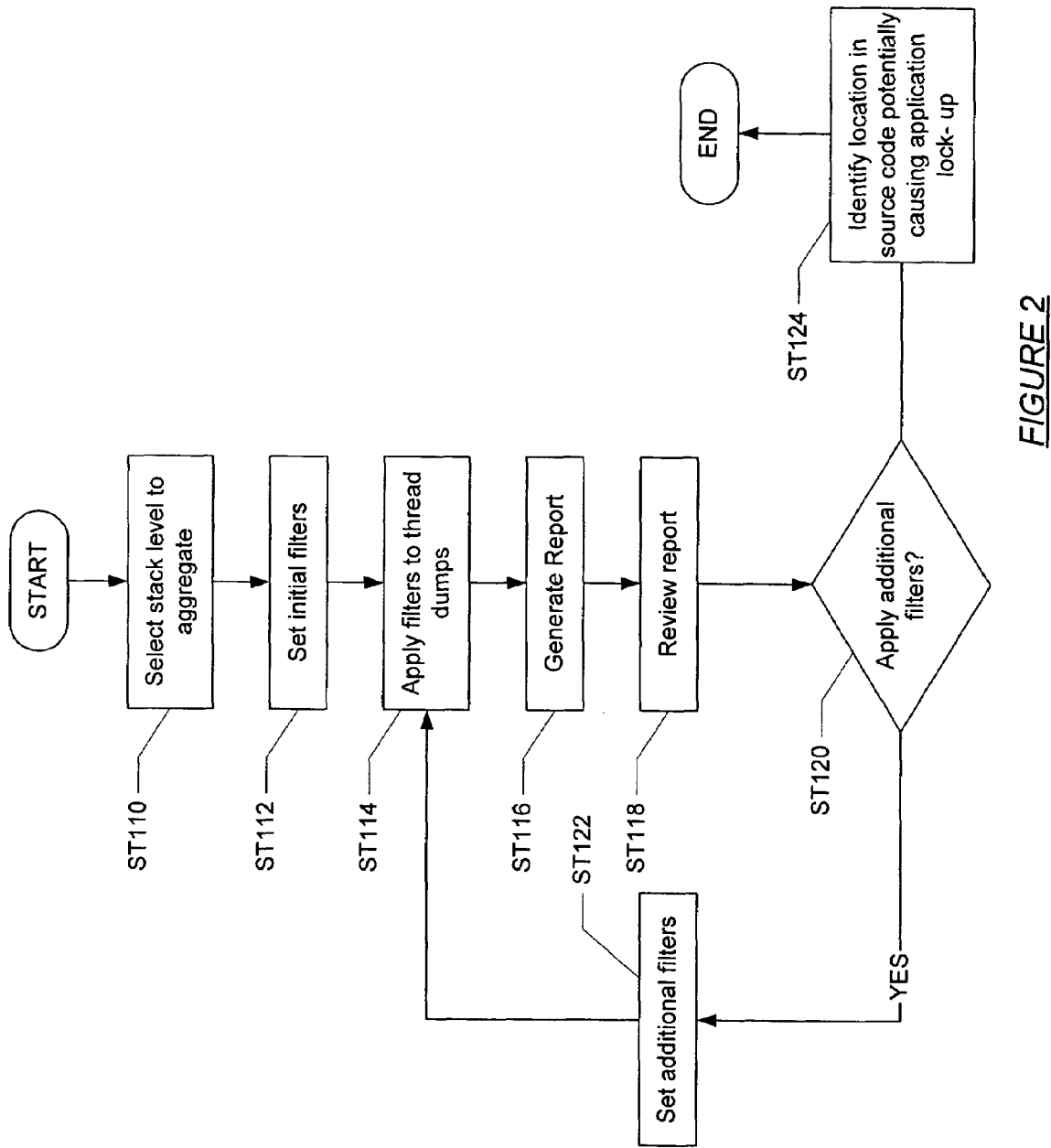

FIG. 2 shows a flow chart describing the operation of the analyzer tool in accordance with one embodiment of the invention. Initially, the stack level at which to aggregate the threads within the dump is selected (ST110). In one embodiment of the invention, the stack level of a particular execution environment may be set to a default stack level if no stack level is specifically selected. Further, in one embodiment of the invention, the default stack level is level 3 (starting from the top of the thread stack).

Once the stack level has been set, the initial filters in the analyzer tool are set (ST112). In one embodiment of the invention, if the user of the analyzer tool understands the types of threads used within the execution environment in which the application is executing, then the user may decide to set one or more filters. The threads may be filtered with respect to any data used to represent the thread or is associated with the thread. For example, the threads may be filtered using thread name, queue name, thread status, etc. Alternatively, if the user of the analyzer tool is not familiar with the threads used within the execution environment where the application is executing, then the user may decide not to set any initial filters.

Once the initial filters have been set (or not set), the filters are applied to the thread dump (ST114). Those skilled in the art will appreciate that even if no initial filters are set, the data associated with the threads in the thread dump are still aggregated with respect to the function or method present at the selected stack level. Continuing with the FIG. 2, a report is subsequently generated including the results of applying the filters (or only aggregating the data associated with the threads without setting a filter) to the thread dump (ST116). The following table illustrates a report in accordance with one embodiment of the invention.

TABLE 1

Report Resulting From Filtering Thread Dump

| Count | Name | Queue | Status | Stack Level 3 |
|---|---|---|---|---|
| 1 | ExecuteThread: | default | waiting for moni | java.lang.reflect.Method.invoke(Native Method) |
| 1 | Signal Dispatcher | NULL | waiting on monit | <<NO TOP OF STACK FOUND>> |
| 1 | ExecuteThread: | JMS.TimerTreePool | waiting on monit | weblogic.kernel.ExecuteThread.waitForRequest(ExecuteThread.java:94) |
| 1 | HighPriority TimeEve | NULL | waiting on monit | weblogic.time.common.internal.TimeEventGenerator.run[TimeEventGenerator. |

TABLE 1-continued

Report Resulting From Filtering Thread Dump

| Count | Name | Queue | Status | Stack Level 3 |
|---|---|---|---|---|
| 2 | ExecuteThread: | default | waiting for moni | weblogic.idbc.common.internal.ConnectionEnv.destroy[ConnectionEnv.java:52 |
| 10 | ExecuteThread: | _weblogic_admin_rmi_ | waiting on monit | weblogic.kernel.ExecuteThread.waitForRequest(ExecuteThread.java:94) |
| 1 | SpinnerRandomSource | NULL | waiting on monit | weblogic.security.SpinnerRandomBitsSource.run(SpinnerRandomBitsSource.ja |
| 1 | Application Manager | NULL | waiting on monit | weblogic.management.mbeans.custom.ApplicationManager$ApplicationPoller |
| 87 | ExecuteThread: | JMS.TimerClientPool | waiting on monit | weblogic.kernel.ExecuteThread.waitForRequest(ExecuteThread.java:94) |
| 1 | ExecuteThread: | default | waiting on monit | weblogic.transaction.internal.ServerTransactionImpl.globalRollback(ServerTra |
| 1 | ExecuteThread: | default | waiting for moni | weblogic.time.common.internal.ScheduledTrigger.executeLocally(ScheduledTri |
| 1 | VM Periodic Task Thr | NULL | waiting on monit | <<NO TOP OF STACK FOUND>> |
| 93 | ExecuteThread: | default | waiting for moni | weblogic.common.internal.ResourceAllocator.reserve(ResourceAllocatorjava: |
| 3 | ExecuteThread: | weblogic.transaction. | waiting on monit | weblogic.kernel.ExecuteThread.waitforRequest(ExecuteThread.java:94) |
| 72 | ExecuteThread: | default | waiting on monit | weblogic.kernel.ExecuteThread.waitforRequest(ExecuteThread.java:94) |
| 2 | RMI RenewClean- | 30.1.3.13 | waiting on monit | sun.rmi.transport.DGCClient$EndpointEntry$RenewCleanThread.run(DGCClient |
| 1 | ListenThread | NULL | runnable | java.net.ServerSocket.implAccept(ServerSocket.java:243) |
| 1 | Thread- | NULL | waiting on monit | java.lang.Thread.run(Thread.java:484) |
| 1 | VM Thread | NULL | runnable | <<NO TOP OF STACK FOUND>> |
| 2 | ExecuteThread: | _weblogic_admin_html | waiting | weblogic.kernel.ExecuteThread.waitForRequest(ExecuteThread.java:94) |
| 15 | ExecuteThread: | JmsDispatcher | waiting on monit | weblogic.kernel.ExecuteThread.waitForRequest(ExecuteThread.java:94) |
| 2 | Heartbeat | NULL | waiting on monit | POS2.Server.CustomerAccountCARE.CareConnectionManager.run(CareConnecti |
| 1 | Finalizer | NULL | waiting on monit | java.lang.ref.ReferenceQueue.remove(ReferenceQueue.java:123) |
| 1 | RMI RenewClean- | sbsccoas23.bscc.bis.c | waiting on monit | sun.rmi.transport.DGCClient$EndpointEntry$RenewCleanThreads sun(DGCClient |
| 1 | ExecuteThread: | default | runnable | weblogic.socket.SocketReaderRequest.execute(Socket ReaderRequest.java:24) |
| 1 | GC Daemon | NULL | waiting on monit | sun.misc.GC$Daemon.run(GC.java:103) |
| 1 | main | NULL | waiting on monit | weblogic.t3.srvr.T3Srvr.waitForDeath(T3Srvr.java:591) |
| 1 | Reference Handler | NULL | waiting on monit | java.lang.ref.Reference$ReferenceHandler.run(Reference.java:110) |
| 1 | Thread- | NULL | waiting for moni | java.util.TimerThread.run(Timer.java:385) |
| 176 | ExecuteThread: | default | waiting for moni | weblogic.transaction.internal.ServerResourceInfo.rollback(ServerResourceInfo. |
| 2 | RMI RenewClean- | 30.1.3.217 | waiting on monit | sun.rmi.transport.DGCClient$EndpointEntry$RenewCleanThread.sun(DGCClient |
| 2 | ExecuteThread: | default | waiting for moni | weblogic.kernel.ExecuteThread.execute (ExecuteThread.java:137) |
| 1 | ExecuteThread: | default | waiting for moni | weblogic.idbc.common.internal.ConnectionPoolRuntimeMBean Impl.get PrepSt |
| 2 | TimeEventGenerator | NULL | waiting on monit | weblogic.time.common.internal.TimeEventGenerator.run(TimeEventGenerator. |

Table 1 above includes a count field, a name field, a queue field, a status field, and a stack level field. In this particular example, the count field indicates the number of threads in the thread dump that have the same matching fields (i.e., the thread name, queue name, status, and function at the specified stack level). Further, the name field indicates the thread name, the queue field indicates the queue name, the status field indicates the status of the thread at the time of the thread dump (or slightly before), and the stack level field indicates the contents of the stack level (i.e., the function or method call listed at the specified stack level). Though not shown in Table 1, each report may also include a time stamp corresponding to the time the thread dump used was obtained.

Those skilled in the art will appreciate that the analyzer tool may be implemented as a text-based tool or a tool having a graphical user interface. Further, the analyzer tool may be implemented using any programming language from a scripting tool such as PERL to a high level language such as C++.

After the report is generated, the report is reviewed (ST118). In one embodiment of the invention, the user may review the report and determine an appropriate course of action. Alternatively, a system that includes a heuristics engine (i.e., a rules engine) may be able to parse the report, identify patterns, and determine the next course of action based on the patterns identified in the report. Once the report has been reviewed, a determination is made as to whether to apply additional filters (ST120). In one embodiment of the invention, additional filters may be applied if initially no filters were applied. Further, in some instances, additional filters may be applied to narrow down the number of rows in the report (i.e., narrow down the groups of threads that are of interest), thereby more accurately pinpointing the potential cause(s) of the application lock-up.

If a determination, is made to apply additional filters, additional filters are set (ST122) and ST114-ST120 are repeated. The goal of repeating ST114-ST120 is to more accurately pinpoint the potential source of the application lock-up. Those skilled in the art will appreciate that the additional filters are not applied to the original thread dump but to the previously filtered thread dump. Alternatively, the additional filters along with the initial filters may be applied to the original thread dump.

Once a determination is made that no additional filters need to be applied to the thread dump, the location in the source code potentially causing the application lock-up is identified (ST124). The identification of the particular location that is potentially causing the application to lock-up may be obtained using the name of the function listed in the stack level field of the generated report. Using the function name, the particular line(s) within the source code that are causing the application lock-up may be identified. In one embodiment of the invention, identifying the location in the source code that is potentially causing the application to lock-up includes identifying a particular thread (or set of threads) that may be the effect or the cause of the application lock-up. As noted above, the thread (set of threads) is identified by setting the various filters and aggregating the threads using the filters.

In one embodiment of the invention, a set of threads that is identified as the potential cause or effect of the application lock-up is typically evidenced by a large value in the "count field" of the generated report by the analyzer tool (see Table 1 above). The stack trace of one or more threads in the set is obtained and analyzed to determine what was occurring at that particular thread when the application locked-up. In some instances, if a given set of threads all have the same function executing at a particular stack level, then a high likelihood that the set of threads have identical or nearly identical stack traces exists. Thus, only a single thread from the set of threads identified above may need to be analyzed.

The following example illustrates a use of the method described in FIG. 2 in accordance with one embodiment of the invention. Assume that Table 1 above is the initial report generated by applying no initial filters (i.e., aggregating only on the stack level). The result of applying no filter generated a large list of sets of threads (i.e., a large number of rows in the table). This sets of threads list may be reduced by applying a second filter, namely thread name="ExecuteThread." The results of applying the second filter are shown in Table 2.

TABLE 2

Report Resulting From Filtering Thread Dump

| Count | Name | Queue | Status | Stack Level 3 |
|---|---|---|---|---|
| 1 | ExecuteThread: | default | waiting for moni | java.lang.reflect.Method.invoke.(Native Method) |
| 1 | Execute Thread: | JMS.TimerTreePool | waiting on monit | weblogic.kernel.ExecuteThread.waitForRequest(ExecuteThread.java:94) |
| 2 | ExecuteThread: | default | waiting for moni | weblogic.jdbc.common.internal.ConnectionEnv.destroy(ConnectionEnv.java:521) |
| 10 | ExecuteThread: | __weblogic__admin__rmi__ | waiting on monit | weblogic.kernel.ExecuteThread.waitForRequest(ExecuteThread.java:94) |
| 87 | ExecuteThread: | JMS.TimerClientPool | waiting on monit | weblogic.kernel.ExecuteThread.waitForRequest(ExecuteThread.java:94) |
| 1 | ExecuteThread: | default | waiting on monit | weblogic.transaction.internal.ServerTransactionImpl.globalRollback(Server Transa |
| 1 | ExecuteThread: | default | waiting for mobi | weblogic.time.common.internal.ScheduledTrigger.executeLocally(Scheduled Trigg |
| 93 | ExecuteThread: | default | waiting for moni | weblogic.common.internal.ResourceAllocator.reserve(ResourceAllocator.java.400) |
| 3 | ExecuteThread: | weblogic.transaction. | waiting on monit | weblogic.kernel.ExecuteThread.waitForRequest(ExecuteThread.java:94) |
| 72 | ExecuteThread: | default | waiting on monit | weblogic.kernel.ExecuteThread.waitForRequest(ExecuteThread.java:94) |
| 2 | ExecuteThread: | __weblogic__admin__html | waiting on monit | weblogic.kernel.ExecuteThread.waitForRequest(ExecuteThread.java:94) |
| 15 | ExecuteThread: | JmsDispatcher | waiting on monit | weblogic.kernel.ExecuteThread.waitForRequest(ExecuteThread.java:94) |
| 1 | ExecuteThread: | default | runnable on monit | weblogic.socket.SocketReaderRequest.execute(SocketReaderRequest.java:24) |
| 176 | ExecuteThread: | default | waiting for moni | weblogic.transaction.internal.ServerResourceInfo.rollback(ServerResourceInfo.jav |
| 2 | ExecuteThread: | default | waiting for moni | weblogic.kernel.ExecuteThread.execute(ExecuteThread.java:137) |
| 1 | ExecuteThread: | default | waiting for moni | weblogic.jdbc.common.internal.ConnectionPoolRuntimeMBeanImpl.getPrepStmt |

The results of applying the second filter, as shown in FIG. 2, indicate that 72 threads are blocked in "WaitForRequest( )" method, 93 threads are blocked in the "ResourceAllocator.reserve( )" method, and 176 threads are blocked in the "roll back" method. At this stage, a high probability exists that the three aforementioned sets of the threads reflect the effect of the application lock-up and may provide insight into the cause of the application lock-up.

In this particular example, a review of the stack traces associated with the three identified sets of threads reveals that the first and second sets of threads (i.e., the 72 threads blocked in the "WaitForRequest( )" method and the 93 threads blocked in the "ResourceAllocator.reserve( )" method), while waiting, are nonetheless operating normally.

However, a review a stack trace corresponding to the third set of threads (i.e., the 176 threads blocked in the "roll back" method) reveals that this set of threads corresponds to the effect of the container lock-up. Further analysis of the stack trace of the third set of threads reveals that the threads are attempting to roll back but are all waiting due to a blocked method call. Once the cause is identified, the application source code may be modified accordingly to solve the problem.

Those skilled in the art will appreciate that the method described above in FIG. 2 may be extended to use in situations where multiple thread dumps are available for a given application. For example, if three sequential thread dumps were taken at 5 second intervals on a system that was not responding in an acceptable period of time, the analyzer tool may extract data to allow a user (or a heuristics engine) to determine which threads are present in every thread dump. The persistence of a particular thread (or set of threads) in every thread dump may indicate that this thread (or set of threads) is attempting to execute functions that are being blocked due to a source code error, etc.

Figure 3:
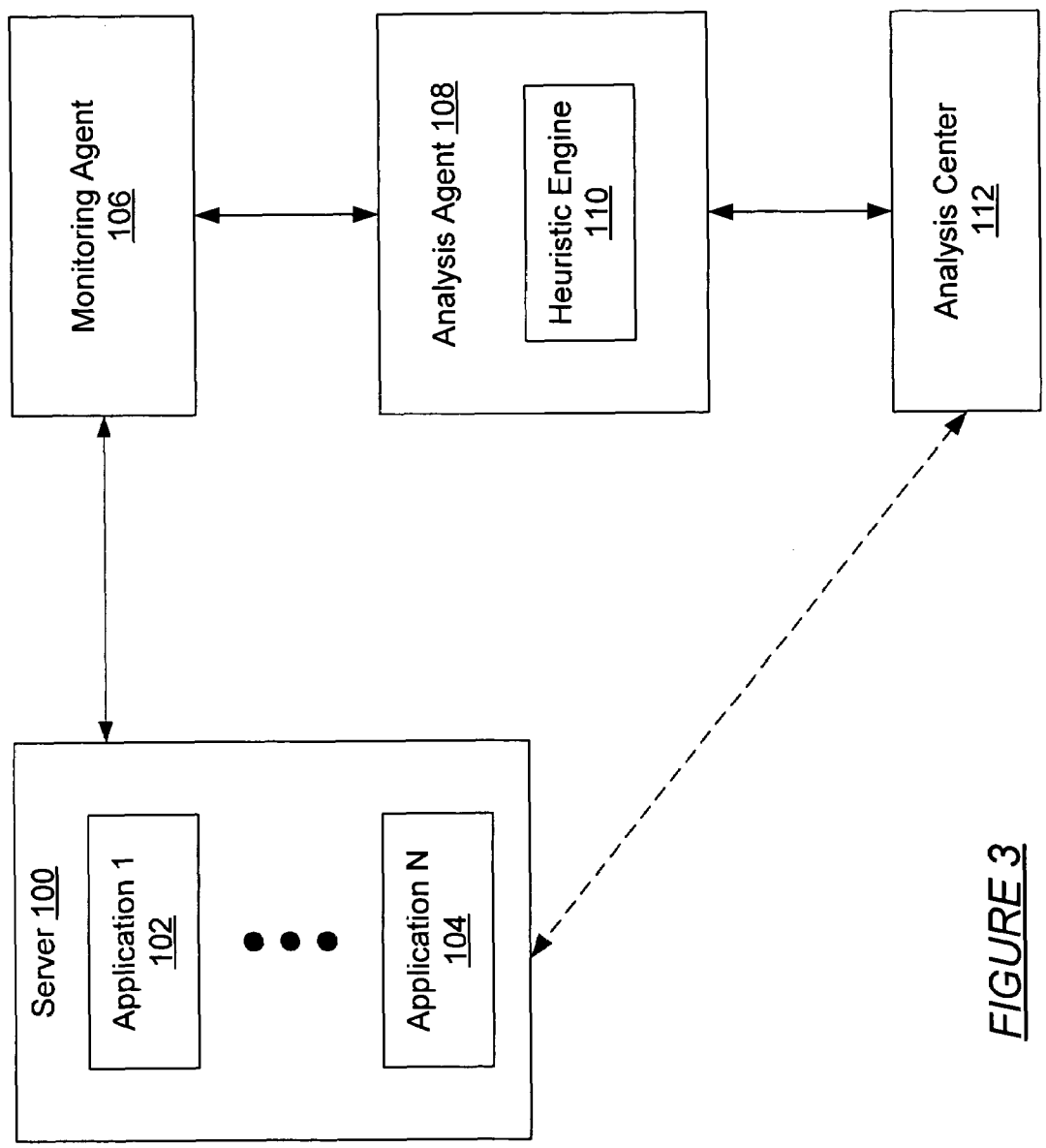
FIG. 3 shows a system in accordance with an embodiment of the invention.

FIG. 3 shows a system for continuous analysis of multiple applications in accordance with one embodiment of the system. The system includes a server (100) executing a number of applications (i.e., Application 1 (102), Application N (104)). The applications (i.e., Application 1 (102), Application N (104)) are monitored by a monitoring agent (106). In one embodiment of the invention, the monitoring agent (106) includes functionality to periodically collect thread dumps for each of the applications (i.e., Application 1 (102), Application N (104)) executing on the server (100). The monitoring agent (106) also includes functionality to collect thread dumps as requested by the analysis agent (108).

The periodic thread dumps and requested thread dumps are forwarded to an analysis agent (108). In one embodiment of the invention, the analysis agent (108) analyzes the thread dumps to determine whether the application (i.e., Application 1 (102), Application N (104)) is executing within normal operating conditions (as defined by the application users, designers, etc.). More specifically, in one embodiment of the invention, the analysis agent (108) includes a heuristics engine (110) which includes functionality to analyze the thread dumps executing an appropriate action. In one embodiment of the invention, the analysis agent (108) may analyze the thread dumps by setting certain filters, aggregating the threads within the thread dumps, and forwarding the results to the heuristics engine (110). Depending on the sophistication of the heuristics engine (110), the heuristics engine (110) may include functionality to determine whether the application (i.e., Application 1 (102), Application N (104)) has locked-up or that a high probably exists that the application locking-up, and request that the monitoring agent (106) obtain additional thread dumps. Further, in one embodiment of the invention, the heuristics engine (110) includes functionality to determine a potential cause of the application lock-up and make the appropriate modifications to the application.

Further, the heuristics engine (110) may include functionality to determine that the thread dumps for a particular application (i.e., Application 1 (102), Application N (104)) must be sent to an analysis center for further analysis (112). In one embodiment of the invention, the analysis center (112) includes analysts that will manually analyze the thread dumps using embodiments of method described in FIG. 2.

Figure 4:
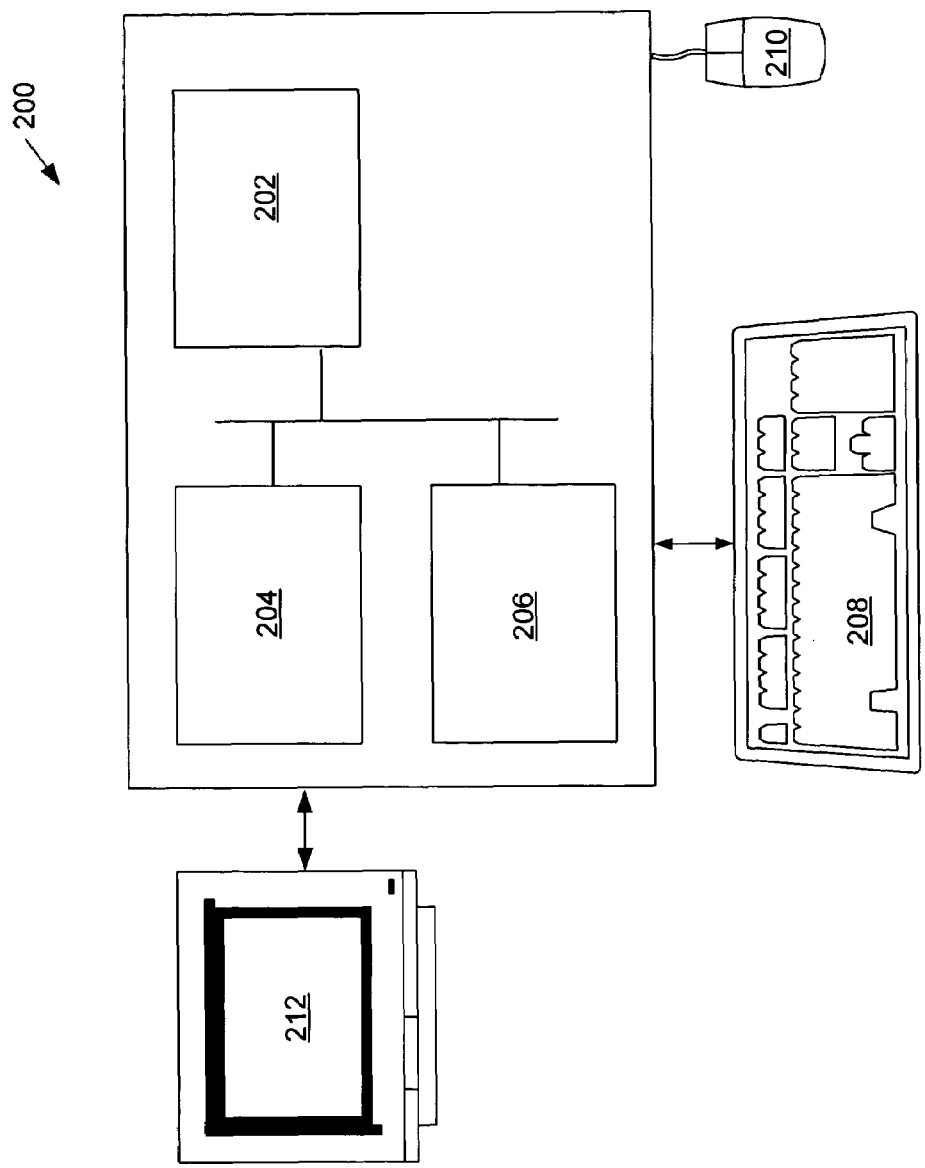
FIG. 4 shows a computer system in accordance with an embodiment of the invention.

The invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network.

Those skilled in the art will appreciate that the components of the invention may be distributed across a plurality of nodes, where each of the nodes includes at least a processor. Further, the nodes may also include associated memory, input devices, output devices, etc. In addition, the nodes may communicate with other nodes via network protocols, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing an application comprising:
obtaining a thread dump of a plurality of threads executing the application, wherein the thread dump comprises a plurality of stack levels of each of the plurality of threads executing the application, and wherein the application comprises a plurality of methods;
analyzing the thread dump to obtain a final result using an aggregation mechanism, wherein analyzing the thread dump using the aggregation mechanism comprises:
for each set of attribute values of a plurality of sets of attribute values:
aggregating the plurality of threads to obtain a total number of threads having the same set of attribute values,
wherein each set of attribute values comprises attribute values identifying a method being executed of the plurality of methods and a stack level in which the method is located of the plurality of stack levels when the thread dump is performed,
wherein the final result comprises the set of attribute values associated with the total number of threads;
selecting, from the final result, a set of attribute values corresponding to the highest total number of threads from the plurality of sets of attribute values; and
determining a potential error location in source code of the application according to the set of attribute values corresponding to the highest total number of threads.

2. The method of claim 1, further comprising:
detecting an application lock-up of the application;
notifying a system executing the application to obtain the thread dump.

3. The method of claim 2, wherein detecting the application lock-up comprises:
obtaining a periodic thread dump;
analyzing the periodic thread dump to obtain a monitoring result; and notifying the system if the monitoring result exceeds a pre-determined threshold.

4. The method of claim 1, wherein obtaining the thread dump comprises obtaining multiple thread dumps of the plurality of threads executing the application at different times.

5. The method of claim 4, wherein each of the multiple thread dumps comprises a time stamp.

6. The method of claim 5, wherein analyzing the thread dump to obtain the final result comprises analyzing each of the multiple thread dumps using the time stamp.

7. The method of claim 1, wherein the thread dump comprises a state of the application.

8. The method of claim 1, wherein analyzing the thread dump using the aggregation mechanism comprises:
   setting a first filter to aggregate the thread dump at the stack level; and
   filtering the thread dump using the first filter to obtain a first intermediate result.

9. The method of claim 8, wherein the analyzing the thread dump using the aggregation mechanism further comprises:
   determining whether the first intermediate result corresponds to the final result to display in a report;
   if the first intermediate result does not correspond to the final result:
      setting a second filter to aggregate thread dump in the intermediate result; and
      filtering the thread dump in the intermediate result using the second filter to obtain a second intermediate result; and
   if the first intermediate result corresponds to the final result:
      generating the report using the first intermediate result.

10. The method of claim 9, wherein determining whether the first intermediate result corresponds to the report comprises determining whether the first intermediate result comprises information necessary to determine the potential error location.

11. The method of claim 9, wherein the analyzing the thread dump further comprises:
   determining whether the second intermediate result corresponds to the final result; and
   generating the report using the second intermediate result, if the second intermediate result corresponds to the final result.

12. The method of claim 11, wherein determining whether the second intermediate result corresponds to the final result comprises determining whether the second intermediate results includes information necessary to determine the potential error location.

13. The method of claim 9, wherein setting the second filter comprises:
   specifying a thread name.

14. The method of claim 9, wherein setting the second filter comprises:
   selecting a queue name.

15. The method of claim 9, wherein setting the second filter comprises:
   selecting a thread status.

16. The method of claim 1, wherein each set further comprises attribute values identifying a thread status.

17. The method of claim 1, wherein the determining the potential error location comprises at least one line of the source code.

18. The method of claim 1, wherein determining the potential error location using the final result comprises using a heuristics engine to identify a pattern in the result and perform an action based on the final result.

19. An apparatus comprising:
   a processor;
   an application comprising a plurality of methods;
   a plurality of threads executing the application on the processor; and
   an analyzer agent configured to:
      obtain a thread dump of the plurality of threads when the application locks-up, wherein the thread dump comprises a plurality of stack levels of each of the plurality of threads executing the application,
      aggregate data associated with the plurality of threads in the thread dump using a filter to obtain a result, wherein aggregating data comprises:
         for each set of attribute values of a plurality of sets of attribute values:
            aggregating the plurality of threads to obtain a total number of threads having the same set of attribute values,
         wherein each set of attribute values comprises attribute values identifying a method being executed of the plurality of methods and a stack level in which the method is located of the plurality of stack levels when the thread dump is performed,
         wherein the result comprises the set of attribute values associated with the total number of threads;
      selecting, from the result, a set of attribute values corresponding to the highest total number of threads from the plurality of sets of attribute values, and
      determine a potential error location in source code of the application according to the set of attribute values corresponding to the highest total number of threads.

20. The apparatus of claim 19, further comprising:
   a monitoring agent configured to:
      monitor the plurality of threads executing the application;
      obtain the thread dump if the application locks-up; and
      forward the thread dump to the analyzer agent.

21. The apparatus of claim 20, wherein the monitoring agent is further configured to:
   obtain periodic thread dumps; and
   forward the periodic thread dumps to the analyzer agent.

22. The apparatus of claim 21, wherein the analyzer agent is further configured to:
   analyze the periodic thread dumps to determine whether the application is operating within a normal operating range.

23. The apparatus of claim 22, wherein analyzing the periodic thread dumps comprises aggregating data associated with the plurality of threads in the periodic thread dump using a filter to obtain a periodic result.

24. The apparatus of claim 23, wherein the periodic result is compared with a pre-determined value to determine whether the application is operating in a normal operating range.

25. The apparatus of claim 24, wherein a system which controls the threads executing the application is modified to return the application to the normal operating range, if analysis of the periodic result indicates that the application is operating outside the normal operating range.

26. The apparatus of claim 19, wherein each set of attribute values further comprises attribute values identifying a thread name.

27. The apparatus of claim 19, wherein each set of attribute values further comprises attribute values identifying a thread status.

28. The apparatus of claim 19, wherein each set of attribute values further comprises attribute values identifying a queue name.

29. The apparatus of claim 19, wherein the analyzer agent is further configured to generate a report.

30. The apparatus of claim 19, wherein the determining the potential error location comprises at least one line of the source code.

31. The apparatus of claim 19, wherein the analyzer agent determines the potential error location using a heuristics engine to identify a pattern in the result and perform an action based on the result.

32. A plurality of nodes, comprising:
a processor on each of the plurality of nodes;
an application comprising a plurality of methods;
a plurality of threads executing the application on one of the plurality of processors; and
an analyzer agent executing on one of the plurality of processors and configured to:
obtain a thread dump of the plurality of threads when the application locks-up, wherein the thread dump comprises a plurality of stack levels of each of the plurality of threads executing the application,
aggregate data associated with the plurality of threads in the thread dump using a filter to obtain a result, wherein analyzing the thread dump using the aggregation mechanism comprises:
for each set of attribute values of a plurality of sets of attribute values:
aggregating the plurality of threads to obtain a total number of threads having the same set of attribute values,
wherein each set of attribute values comprises attribute values identifying a method being executed of the plurality of methods and a stack level in which the method is located of the plurality of stack levels when the thread dump is performed,
wherein the result comprises the set of attribute values associated with the total number of threads;
selecting, from the result, a set of attribute values corresponding to the highest total number of threads from the plurality of sets of attribute values, and
determine a potential error location in source code of the application using the result;
wherein an application byte code corresponding to the application resides on any of the plurality of nodes,
wherein each of the plurality of threads executes the application on any of the plurality of nodes,
wherein the analyzer agent executes on any of the plurality of nodes.

33. The plurality of nodes of claim 32, further comprising:
a monitoring agent configured to:
monitor the plurality of threads executing the application;
obtain the thread dump if the application locks-up; and
forward the thread dump to the analyzer agent,
wherein the monitoring agent resides on any of the plurality of nodes.

34. A computer system for analyzing an application comprising:
a processor;
a memory;
a storage device; and
software instructions stored in the memory for enabling the computer system under control of the processor, to:
analyze a thread dump to obtain a result, wherein the thread dump comprises a plurality of stack levels of each of the plurality of threads executing the application, wherein the application comprises a plurality of methods, and wherein analyzing the thread dump using the aggregation mechanism comprises:
for each set of attribute values of a plurality of sets of attribute values:
aggregating the plurality of threads to obtain a total number of threads having the same set of attribute values,
wherein each set of attribute values comprises attribute values identifying a method being executed of the plurality of methods and a stack level in which the method is located of the plurality of stack levels when the thread dump is performed,
wherein the result comprises the set of attribute values associated with the total number of threads;
selecting, from the result, a set of attribute values corresponding to the highest total number of threads from the plurality of sets of attribute values; and
determine a potential error location in an application source code according to the set of attribute values corresponding to the highest total number of threads,
wherein the thread dump comprises the state of the application.

35. The computer system of claim 34, further comprising software instructions to:
detect an application lock-up of the application; and
notify a system executing the application to obtain the thread dump.

36. The computer system of claim 35, wherein detecting the application lock-up comprises:
obtaining a periodic thread dump;
analyzing the periodic thread dump to obtain a monitoring result; and
notifying the system if the monitoring result exceeds a pre-determined threshold.

37. The computer system of claim 34, wherein software instructions to analyze the thread dump comprise instructions to filter the thread dump using the first filter to obtain an intermediate result.

* * * * *